US012635599B2

(12) United States Patent
LeBoeuf

(10) Patent No.: US 12,635,599 B2
(45) Date of Patent: May 26, 2026

(54) ATTACHABLE GAP BLADE DEVICE FOR TWIN-BLADE LAWNMOWERS

(71) Applicant: Kurt LeBoeuf, Luling, TX (US)

(72) Inventor: Kurt LeBoeuf, Luling, TX (US)

( * ) Notice: Subject to any disclaimer, the term of this patent is extended or adjusted under 35 U.S.C. 154(b) by 337 days.

(21) Appl. No.: 18/507,689

(22) Filed: Nov. 13, 2023

(65) Prior Publication Data

US 2024/0423124 A1 Dec. 26, 2024

Related U.S. Application Data

(60) Provisional application No. 63/509,048, filed on Jun. 20, 2023.

(51) Int. Cl.
*A01D 34/73* (2006.01)
*A01D 34/00* (2006.01)

(52) U.S. Cl.
CPC ......... *A01D 34/733* (2013.01); *A01D 34/001* (2013.01)

(58) Field of Classification Search
CPC .... A01D 34/733; A01D 34/001; A01D 34/73; A01D 34/00; A01D 34/01; A01D 34/015; A01D 34/23; A01D 34/40; A01D 34/4165; A01D 34/44; A01D 34/62
See application file for complete search history.

(56) References Cited

U.S. PATENT DOCUMENTS

| | | | |
|---|---|---|---|
| 5,035,107 A | 7/1991 | Scarborough | |
| 5,085,044 A | 2/1992 | Freier, Jr. | |
| 5,133,176 A * | 7/1992 | Baumann | A01D 34/005 |
| | | | 56/320.1 |
| 5,483,789 A | 1/1996 | Gummerson | |
| 6,389,786 B1 * | 5/2002 | Bergsten | A01D 75/30 |
| | | | 56/255 |
| 7,197,863 B1 | 4/2007 | Sugden | |
| 9,480,200 B1 | 11/2016 | Patridge | |
| 9,756,781 B2 | 9/2017 | Zerbarini | |
| 9,924,632 B2 * | 3/2018 | Chenevert | A01D 34/733 |
| 10,517,212 B2 * | 12/2019 | Haun | A01D 34/733 |
| 2023/0035331 A1 * | 2/2023 | Vazquez | A01D 34/66 |

* cited by examiner

*Primary Examiner* — Brad Harcourt
(74) *Attorney, Agent, or Firm* — Brennan, Manna & Diamond, LLC

(57) ABSTRACT

An attachable gap blade device for twin-blade lawnmowers is provided. The device is comprised of a spindle comprised of a pulley and a blade, wherein the spindle attaches to a housing. The housing can be attached to an existing blade housing of a twin-blade lawnmower, wherein the housing is positioned in the center of the gap between the blades. The pulley of the device is attached to the existing belt of the lawnmower such that the belt spins the blade to cut grass.

19 Claims, 5 Drawing Sheets

ATTACHABLE GAP BLADE DEVICE FOR TWIN-BLADE LAWNMOWERS

CROSS-REFERENCE TO RELATED APPLICATION

The present application claims priority to, and the benefit of, U.S. Provisional Application No. 63/509,048, which was filed on Jun. 20, 2023, and is incorporated herein by reference in its entirety.

FIELD OF THE INVENTION

The present invention relates generally to the field of lawnmowers. More specifically, the present invention relates to an attachable gap blade device for twin-blade lawnmowers that provides a blade and housing that can be attached to the blade housing of a twin-blade lawnmower in order to cut any grass missed by the twin blades gap. Accordingly, the present disclosure makes specific reference thereto. Nonetheless, it is to be appreciated that aspects of the present invention are also equally applicable to other like applications, devices, and methods of manufacture.

BACKGROUND

Twin-blade riding mowers, which have become increasingly popular among homeowners and landscapers, offer the primary advantage of being time-efficient when tasked with mowing large expanses of lawns. The design and mechanism behind these mowers focus on covering a larger area in a shorter span of time compared to their single-blade counterparts. Yet, despite their time-saving capabilities, they aren't without their shortcomings.

One notable drawback is that, occasionally, the blades might not cut all areas uniformly. This inconsistency results in patches of grass that remain taller than the rest. When this happens, the person operating the lawnmower has no choice but to navigate back to the missed patch and ensure that it is mowed to match the surrounding area. While this may sound like a minor inconvenience, in practice, it can mean taking up to twice as long to finish mowing a given section of the lawn.

Furthermore, this necessity to double back and re-mow isn't just a drain on time, but also on resources. The lawnmower, in its attempt to correct its initial oversight, ends up consuming more fuel than it would have if it had cut the grass uniformly in the first pass. Over time and with frequent occurrences, this can lead to a noticeable increase in fuel expenditure, which translates to an unnecessary and avoidable financial cost for the operator.

Therefore, there exists a long-felt need in the art for a device that eliminates the possibility of a twin-blade lawnmower missing grass. There also exists a long-felt need in the art for an attachable gap blade device for twin-blade lawnmowers. More specifically, there exists a long-felt need in the art for an attachable gap blade device for twin-blade lawnmowers that can be retrofitted to a twin-blade lawnmower on the blade housing in between the twin blades such that the device cuts grass missed by the twin blades.

The subject matter disclosed and claimed herein, in one embodiment thereof, comprises an attachable gap blade device for twin-blade lawnmowers. The device is comprised of a spindle comprised of a pulley and a blade, wherein the spindle attaches to a housing. The housing can be attached to an existing blade housing of a twin-blade lawnmower, wherein the housing is positioned in the center of the gap between the blades. The pulley of the device is attached to the existing belt of the lawnmower such that the belt spins the blade to cut grass.

In this manner, the attachable gap blade for twin-blade lawnmowers of the present invention accomplishes all the foregoing objectives and provides a device that eliminates the possibility of a twin-blade lawnmower missing grass. To do so, the device can be retrofitted to a twin-blade lawnmower on the blade housing in between the twin blades. As a result, the blade of the device cuts grass missed by the twin blades.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an attachable gap blade device for twin-blade lawnmowers. The device is comprised of a housing that receives at least one spindle with at least one blade, and at least one pulley. The device can be attached to the back or front wall of a lawnmower blade housing between the blades of the mower such that the positioning of the device in between the blades ensures any grass that may be missed by the blades is cut from the blade of the device.

The device is comprised of at least one housing with a top wall comprised of at least one spindle opening. The spindle opening allows the spindle to pass through the housing. The spindle can be secured to the housing via at least one fastener. The spindle may be any type of lawnmower spindle and is comprised of at least one removable blade that can spin 360 degrees around the spindle relative to the Y-axis of the spindle. The top of the spindle is comprised of at least one pulley that can spin 360 degrees around the spindle relative to the Y-axis of the spindle. The existing belt of a lawnmower can be attached around the pulley in order to spin the blade. The belt may be secured within the pulley via at least one pulley bracket attached to the top wall of the housing.

The housing can be attached to the back (or front) wall of a lawnmower blade housing during use. More specifically, the housing is positioned in the center of the gap between both blades. In this manner, the positioning of the housing in this location ensures any grass missed by the blades gap is cut by the blade of the device. The housing can be attached to the wall by placing at least one fastener through at least one opening of the sidewall and into the back (or in another embodiment, front) wall of the lawnmower blade housing. Further, the housing may be comprised of a mounting bracket comprised of at least one opening. As a result, a user can place at least one fastener such as, but not limited to, a bolt, a bolt and nut, etc., through at least one opening and into the back (or front) wall.

The present invention is also comprised of a method of using the device. First, a device is provided comprised of a housing comprised of a mounting bracket, a pulley bracket, and a spindle received by the housing 110, the spindle is comprised of at least one blade and at least one pulley. Then, the spindle can be placed through the opening of the housing and secured to the housing by placing at least one fastener through at least one opening of the top wall of the housing. Then, the housing can be attached to the back (or front) wall of a lawnmower blade housing, in the center of the gap between the two blades of the mower, by placing at least one fastener through an opening of the side wall and through an opening of the mounting bracket. Then, a user can attach at least one pulley belt of the lawnmower around the pulley. Finally, the user can cut grass with the lawnmower wherein the blade cuts any grass missed by the existing mower blades.

Accordingly, the attachable gap blade for twin-blade lawnmowers of the present invention is particularly advantageous as it provides a device that eliminates the possibility of a twin-blade lawnmower missing grass. To do so, the device can be retrofitted to a twin-blade lawnmower on the blade housing in between the twin blades. As a result, the blade of the device cuts grass missed by the twin blades. In this manner, the attachable gap blade for twin-blade lawnmowers overcomes the limitations of existing twin-blade mowers known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
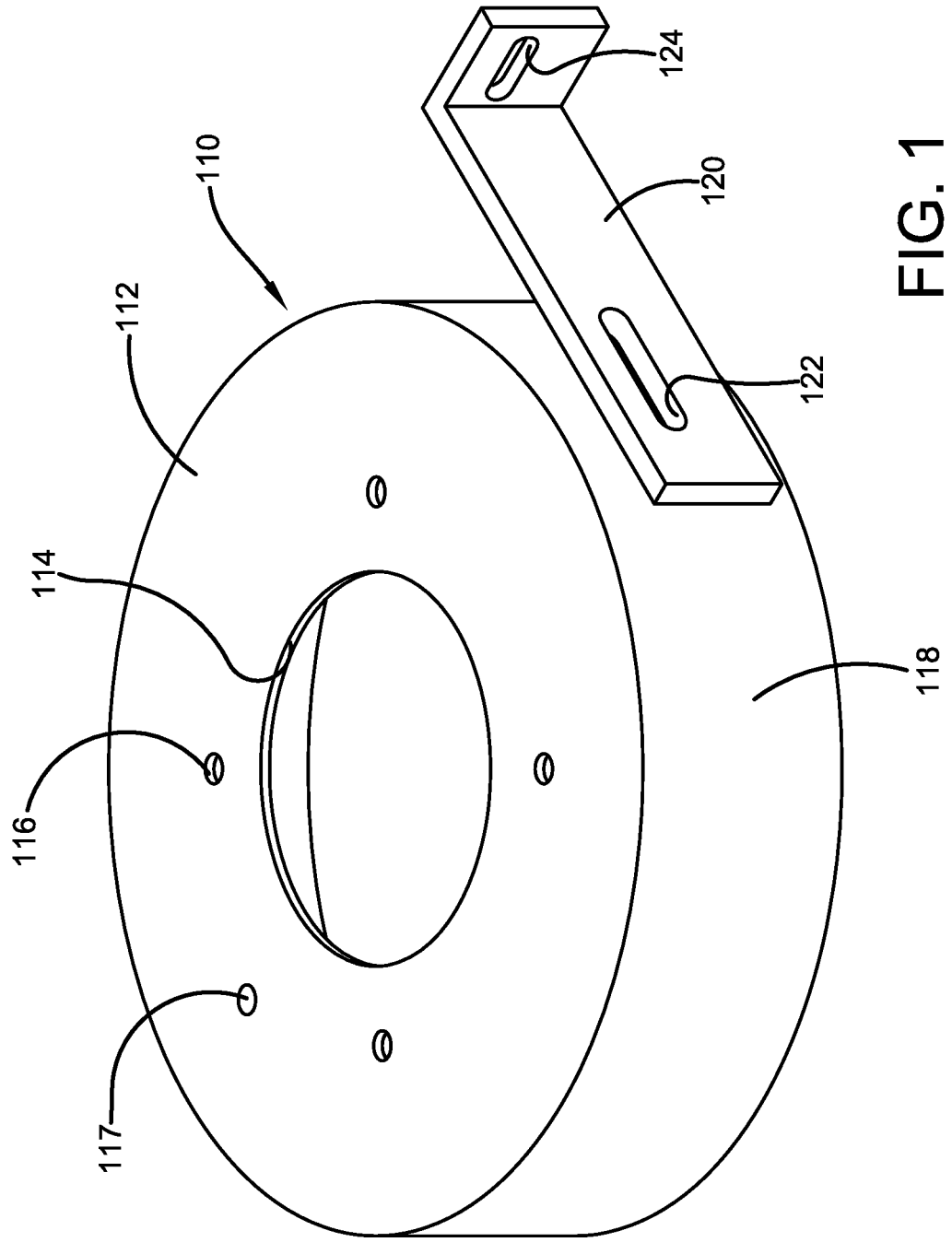
FIG. 1 illustrates a perspective view of a housing of one potential embodiment of an attachable gap blade device for twin-blade lawnmowers of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that eliminates the possibility of a twin-blade lawnmower missing grass. There also exists a long-felt need in the art for an attachable gap blade device for twin-blade lawnmowers. More specifically, there exists a long-felt need in the art for an attachable gap blade device for twin-blade lawnmowers that can be retrofitted to a twin-blade lawnmower on the blade housing in between the twin blades such that the device cuts grass missed by the twin blades.

The present invention, in one exemplary embodiment, is comprised of an attachable gap blade device for twin-blade lawnmowers. The device is comprised of a housing that receives at least one spindle with at least one blade, and at least one pulley. During use, the device can be attached to the back (or front) wall of a lawnmower blade housing between the blades of the mower such that the positioning of the device in between the blades ensures any grass that may be missed by the blades is cut from the blade of the device.

The device is comprised of at least one housing with a top wall comprised of at least one spindle opening. The spindle opening allows the spindle to pass through the housing. The spindle can be secured to the housing via at least one fastener. The spindle may be any type of lawnmower spindle and is comprised of at least one removable blade that can spin 360 degrees around the spindle relative to the Y-axis of the spindle.

The top of the spindle is comprised of at least one pulley that can spin 360 degrees around the spindle relative to the Y-axis of the spindle. The existing belt of a lawnmower can be attached around the pulley in order to spin the blade. The belt may be secured within the pulley via at least one pulley bracket attached to the top wall of the housing.

The housing can be attached to the back (or front) wall of a lawnmower blade housing during use. More specifically, the housing is positioned in the center of the gap between both blades. In this manner, the positioning of the housing in this location ensures any grass missed by the blades is cut by the blade of the device. The housing can be attached to the wall by placing at least one fastener through at least one opening of the sidewall and into the back (or front) wall of the lawnmower blade housing. Further, the housing may be comprised of a mounting bracket comprised of at least one opening. As a result, a user can place at least one fastener such as, but not limited to, a bolt, a bolt and nut, etc., through at least one opening and into the back (or front) wall.

The present invention is also comprised of a method of using the device. First, a device is provided comprised of a housing comprised of a mounting bracket, a pulley bracket, and a spindle received by the housing 110, the spindle is comprised of at least one blade and at least one pulley. Then, the spindle can be placed through the opening of the housing and secured to the housing by placing at least one fastener through at least one opening of the top wall of the housing. Then, the housing can be attached to the back (or front) wall of a lawnmower blade housing, in the center of the gap between the two blades of the mower, by placing at least one fastener through an opening of the side wall and through an opening of the mounting bracket. Then, a user can attach at least one pulley belt of the lawnmower around the pulley. Finally, the user can cut grass with the lawnmower wherein the blade cuts any grass missed by the existing mower blades.

Accordingly, the attachable gap blade for twin-blade lawnmowers of the present invention is particularly advantageous as it provides a device that eliminates the possibility of a twin-blade lawnmower missing grass. To do so, the device can be retrofitted to a twin-blade lawnmower on the blade housing in between the twin blades. As a result, the blade of the device cuts grass missed by the twin blades. In this manner, the attachable gap blade for twin-blade lawnmowers overcomes the limitations of existing twin-blade mowers known in the art.

Referring initially to the drawings, FIG. 1 illustrates a perspective view of a housing 110 of one potential embodiment of an attachable gap blade device for twin-blade lawnmowers 100 of the present invention in accordance with the disclosed architecture. The device 100 is comprised of a housing 110 that receives at least one spindle 140 with at least one blade 142 and at least one pulley 144. The device 100 can be attached to the back (or front) wall 11 of a lawnmower blade housing 10 between the blades 12 of the mower. In this manner, the positioning of the device 100 in between the blades 12 ensures any grass that may be missed by the blades 12 is cut from the blade 142 of the device 100.

The device 100 is comprised of at least one housing 110. The housing 110 is preferably generally circular and is comprised of a flat top wall 112 and a circumferential side wall 118. The top wall 112 is comprised of at least one spindle opening 114. The spindle opening 114 allows the spindle 140 to pass through the housing 110. The spindle 140 can be secured to the housing by placing at least one fastener 150 such as, but not limited to, a bolt, a bolt and nut, etc., through at least one fastener 116 opening of the top wall 112.

Figure 3:
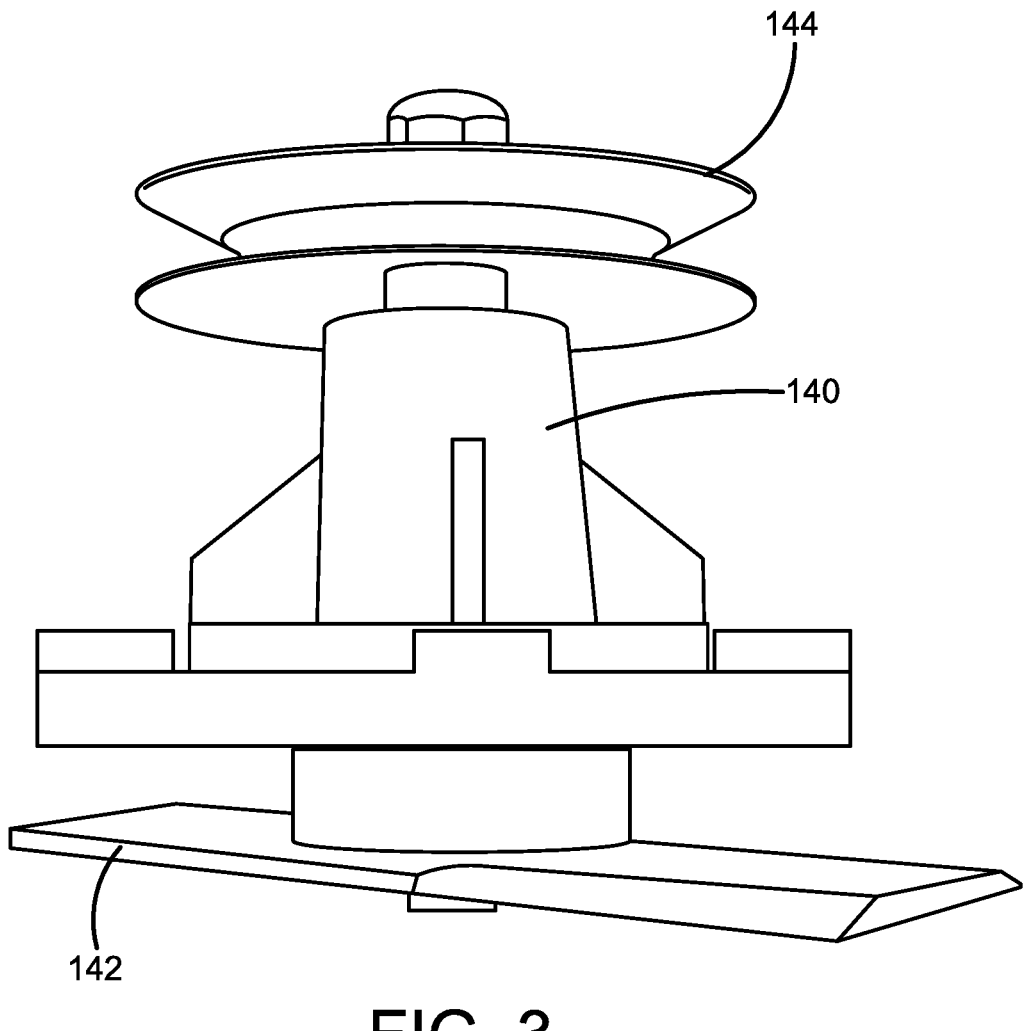
FIG. 3 illustrates a perspective view of a spindle of one potential embodiment of an attachable gap blade device for twin-blade lawnmowers of the present invention in accordance with the disclosed architecture.

The spindle 140 may be any type of lawnmower spindle known in the art of any size, shape, and configuration. The spindle 140 is comprised of at least one removable blade 142 that can spin 360 degrees around the spindle 140 relative to the Y-axis of the spindle 140, as seen in FIG. 3. The blade 142 may be any size, shape, and configuration of lawnmower blade known in the art. The top of the spindle 140 is comprised of at least one pulley 144 that can spin 360 degrees around the spindle 140 relative to the Y-axis of the spindle 140.

In one embodiment, the existing belt of a lawnmower can be attached around the pulley 144 in order to spin the blade 142. In this embodiment, the pulley 144 is a single pulley and the device 100 is attached to a front or back wall 11 of a lawnmower blade housing 10.

In another embodiment wherein the device 100 is attached to a front wall 11 of a lawnmower blade housing 10, the pulley 144 is a single pulley and the device 100 is attached to a front wall 11 of a lawnmower blade housing 10. In this embodiment, at least one existing pulley of the lawnmower (used to drive the existing blades 12 of the mower) is replaced with at least one double pulley. The double pulley allows the existing blades of the mower to be turned while also serving as an attachment point for a belt that attaches to the double pulley and pulley 144 in order to spin the blades 142 of the device 100.

Figure 2:
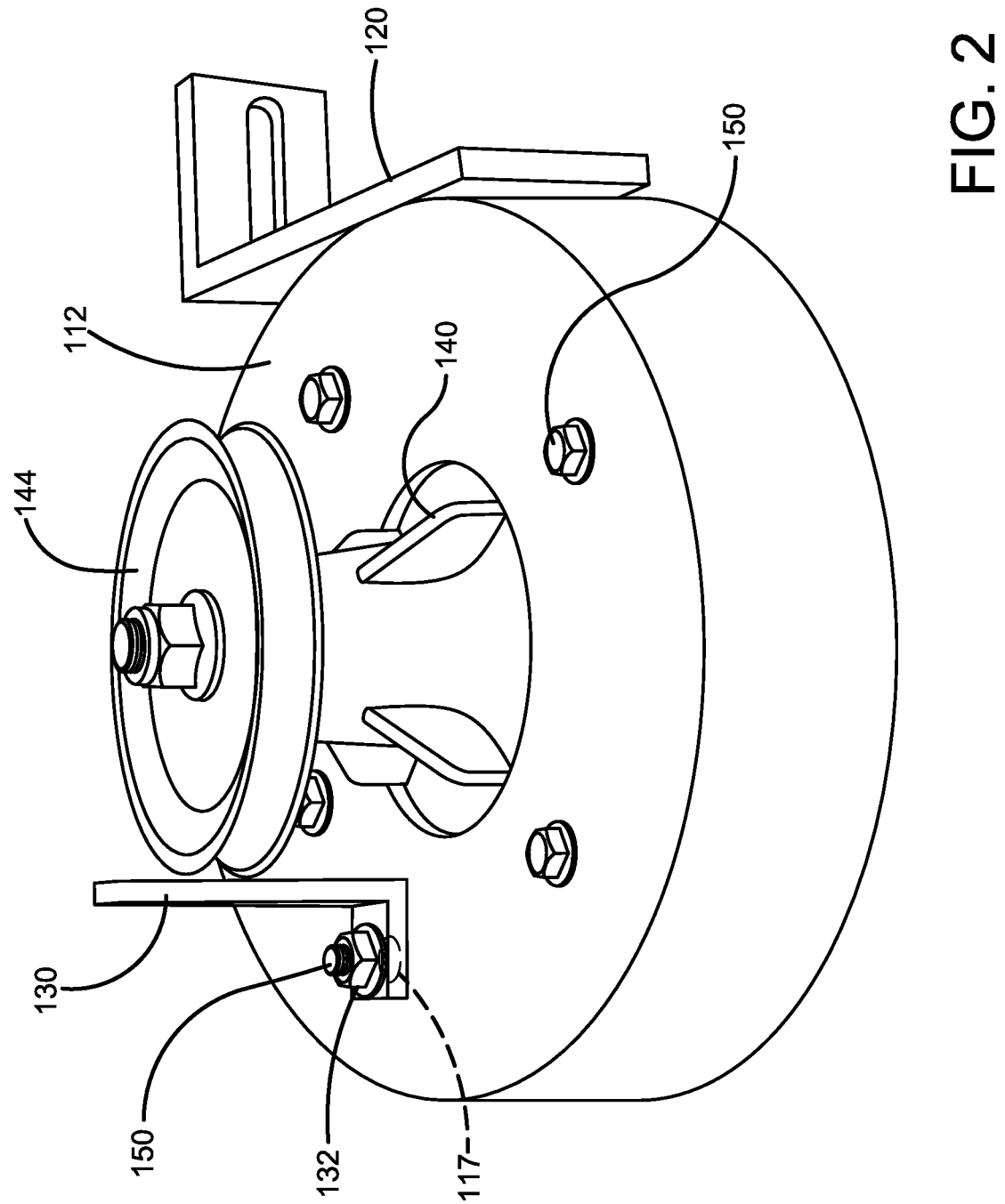
FIG. 2 illustrates a perspective view of one potential embodiment of an attachable gap blade device for twin-blade lawnmowers of the present invention while not attached to a lawnmower in accordance with the disclosed architecture.

The belt may be secured within the pulley 144 via at least one pulley bracket 130, as seen in FIG. 2. The bracket may be fixedly or removably attached to the top wall 112. The bracket 130 is generally L-shaped. In a removable embodiment, the bracket 130 is attached through at least one opening 117 of the top wall 112 and at least one opening 132 of the bracket 130 to secure the bracket 130 above the top wall 112 via at least one fastener 150 such as, but not limited to, a bolt, a bolt and nut, etc. Ensuring the fastener 150 exits the top wall 112 above the top wall 112 ensures it is not struck by the blade 142. The bracket 130 is positioned next to the pulley 144 such that the belt cannot slip off the pulley 144.

Figure 4:
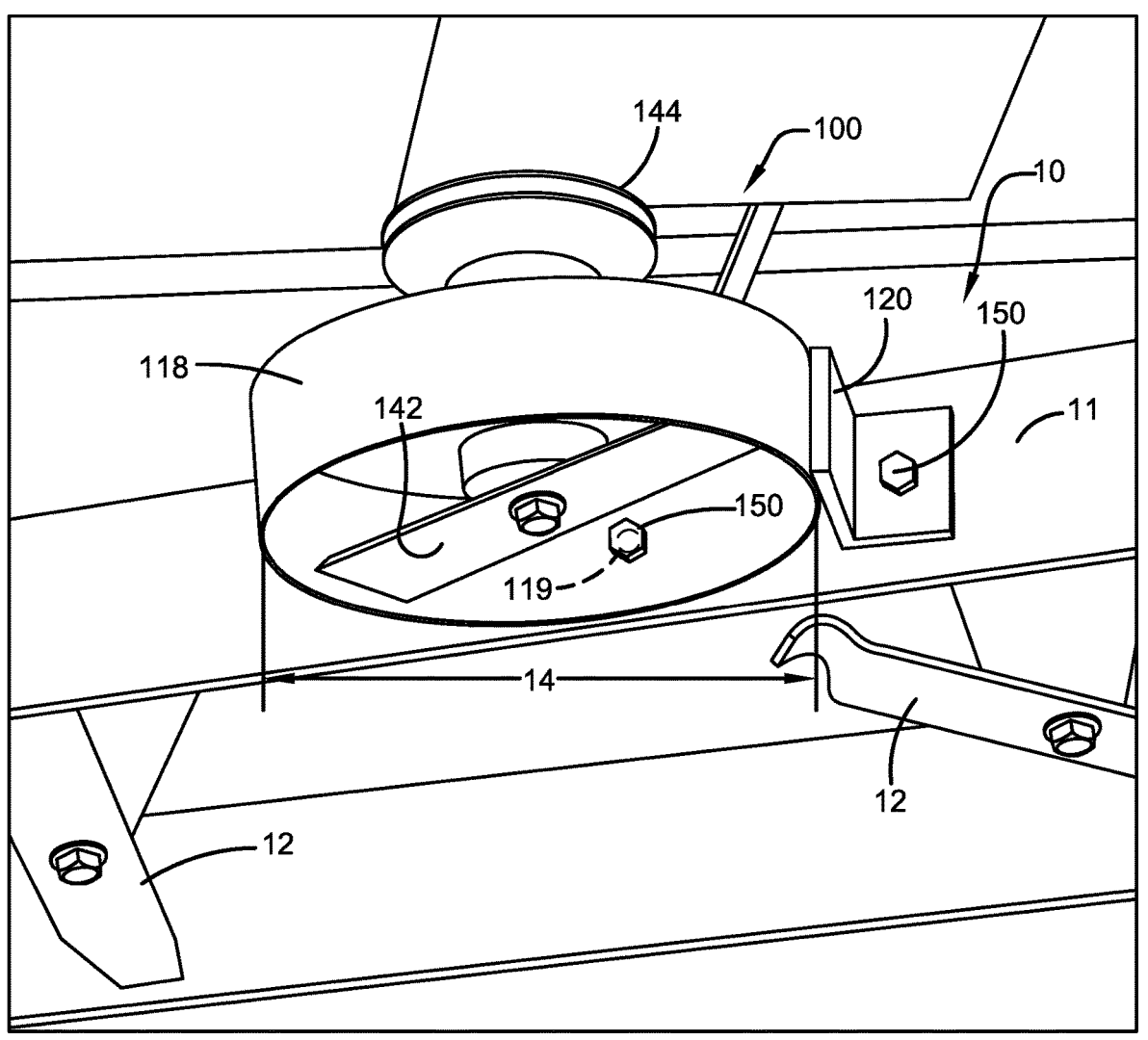
FIG. 4 illustrates a perspective view of one potential embodiment of an attachable gap blade device for twin-blade lawnmowers of the present invention while attached to a lawnmower blade housing in accordance with the disclosed architecture.

The housing 110 can be attached to the back (or front) wall 11 of a lawnmower blade housing 10. More specifically, the housing 110 is positioned in the center of the gap 14 between both blades 12 of the lawnmower, as seen in FIG. 4. In this manner, the positioning of the housing 110 in this location ensures any grass missed by the blades 12 is cut by the blade 142 of the device 100.

The housing 110 can be attached to the wall 11 by placing at least one fastener 150 such as, but not limited to, a bolt, a bolt and nut, etc., through at least one opening 119 of the sidewall 118 and into the back (or front) wall 11. Further, the housing 110 may be comprised of a mounting bracket 120 comprised of at least one opening 124. As a result, a user can place at least one fastener 150 such as, but not limited to, a bolt, a bolt and nut, etc., through at least one opening 124 and into the back (or front) wall 11. In one embodiment, the bracket 120 is fixedly attached to the housing 110. In another embodiment, the bracket 120 is removably attached to the housing 110 via placing at least one fastener 150 such as, but not limited to, a bolt, a bolt and nut, etc., through at least one opening 119 of the sidewall and through at least one opening 122 of the bracket 120.

Figure 5:
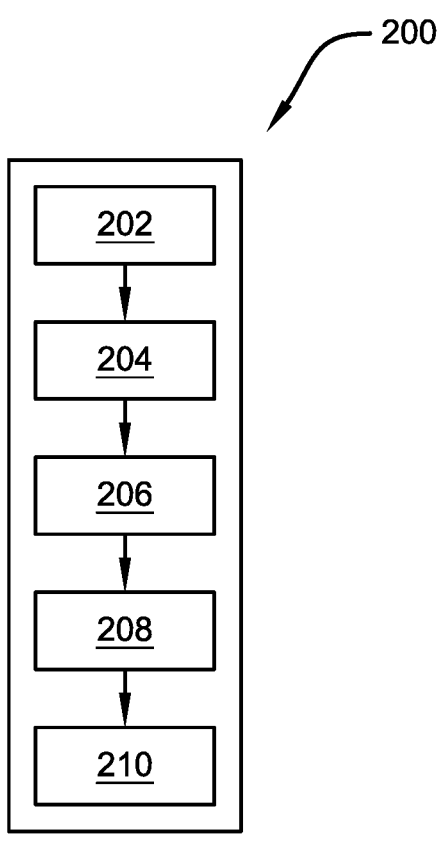
FIG. 5 illustrates a flowchart of a method of using one potential embodiment of an attachable gap blade device for twin-blade lawnmowers of the present invention in accordance with the disclosed architecture.

The present invention is also comprised of a method of using 200 the device 100, as seen in FIG. 5. First, a device 100 is provided comprised of a housing 110 comprised of a mounting bracket 120 and a pulley bracket 130, and a spindle 140 received by the housing 110, the spindle 140 comprised of at least one blade 142 and at least one pulley 144 [Step 202]. Then, the spindle 140 can be placed through the opening 114 of the housing 110 and secured to the housing by placing at least one fastener 150 through at least one opening 116 of the top wall 112 of the housing [Step 204]. Then, the housing 110 can be attached to the back (or front) wall 11 of a lawnmower blade housing 10, in the center of the gap 14 between the two blades 12 of the mower, via placing at least one fastener 150 through an opening 119 of the side wall 118 and through an opening 124 of the mounting bracket 120 [Step 206]. Then, a user can attach at least one pulley belt around the pulley 144 [Step 208]. Finally, the user can cut grass with the lawnmower wherein the blade 142 cuts any grass missed by the existing mower blades 12 [Step 210].

In one embodiment, all components (or any combination thereof) of the device 100 may be fixedly attached to each other via welds.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "attachable gap blade for twin-blade lawnmowers" and "device" are interchangeable and refer to the attachable gap blade for twin-blade lawnmowers 100 of the present invention.

Notwithstanding the foregoing, the attachable gap blade for twin-blade lawnmowers 100 of the present invention and its various components can be of any suitable size and configuration as is known in the art without affecting the overall concept of the invention, provided that they accomplish the above-stated objectives. One of ordinary skill in the art will appreciate that the size, configuration, and material of the attachable gap blade for twin-blade lawnmowers 100 as shown in the FIGS. are for illustrative purposes only, and that many other sizes and shapes of the attachable gap blade for twin-blade lawnmowers 100 are well within the scope of the present disclosure. Although the dimensions of the attachable gap blade for twin-blade lawnmowers 100 are important design parameters for user convenience, the attachable gap blade for twin-blade lawnmowers 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An attachable gap blade device for twin-blade lawnmowers comprising:
    a spindle comprised of a blade and a pulley; and
    a housing that receives the spindle, the housing comprised of a mounting bracket and a pulley bracket, wherein the mounting bracket is comprised of an L-shaped bracket comprised of a fastener opening.

2. The attachable gap blade for twin-blade lawnmowers of claim 1, wherein the housing is comprised of a top wall and a side wall.

3. The attachable gap blade for twin-blade lawnmowers of claim 2, wherein the pulley bracket is positioned on a top wall.

4. The attachable gap blade for twin-blade lawnmowers of claim 2, wherein the mounting bracket is positioned on the side wall.

5. The attachable gap blade for twin-blade lawnmowers of claim 1, wherein the pulley bracket is comprised of an L-shaped bracket.

6. The attachable gap blade for twin-blade lawnmowers of claim 2, wherein the side wall is comprised of an opening.

7. The attachable gap blade for twin-blade lawnmowers of claim 1, wherein the blade can rotate 360 degrees around a Y-axis of the spindle.

8. The attachable gap blade for twin-blade lawnmowers of claim 1, wherein the pulley can rotate 360 degrees around a Y-axis of the spindle.

9. An attachable gap blade device for twin-blade lawnmowers comprising:
    a spindle comprised of a blade and a pulley; and
    a housing comprised of a top wall comprised of a pulley bracket and a side wall comprised of a mounting bracket;
    a first opening and a second opening positioned on the top wall; and
    a third opening positioned on the side wall.

10. The attachable gap blade for twin-blade lawnmowers of claim 9, wherein the first opening receives the spindle.

11. The attachable gap blade for twin-blade lawnmowers of claim 9, wherein the mounting bracket is removably attached or welded to the side wall.

12. The attachable gap blade for twin-blade lawnmowers of claim 9, wherein the mounting bracket is comprised of a fourth opening.

13. The attachable gap blade for twin-blade lawnmowers of claim 9, wherein the pulley bracket is removably attached to the top wall.

14. The attachable gap blade for twin-blade lawnmowers of claim 13, wherein the pulley bracket is comprised of a fifth opening.

15. The attachable gap blade for twin-blade lawnmowers of claim 9, wherein the blade removably attaches to the spindle.

16. The attachable gap blade for twin-blade lawnmowers of claim 15, wherein the blade can rotate 360 degrees around a Y-axis of the spindle.

17. The attachable gap blade for twin-blade lawnmowers of claim 9, wherein the pulley can rotate 360 degrees around a Y-axis of the spindle.

18. The attachable gap blade for twin-blade lawnmowers of claim 9 further comprised of a fastener.

19. A method of using an attachable gap blade device for twin-blade lawnmowers, the method comprising the following steps:
    providing an attachable gap blade device for twin-blade lawnmowers comprised of a housing comprised of a pulley bracket and a spindle received by the housing, the spindle comprised of a blade and a pulley;
    securing the spindle to the housing;
    attaching the housing to a back or a front
    wall of a twin-blade lawnmower blade housing in the center of a gap between a first blade and a second blade of the twin-blade lawnmower;
    attaching a pulley belt around the pulley; and
    mowing grass with the twin-blade lawnmower.

\* \* \* \* \*